(12) United States Patent
Vasishth et al.

(10) Patent No.: US 7,529,931 B2
(45) Date of Patent: May 5, 2009

(54) MANAGING ELEVATED RIGHTS ON A NETWORK

(75) Inventors: Karen Vasishth, Redmond, WA (US); Kimberley Ann Hunter, Snoqualmie, WA (US); Laurie A. Brown, Stanwood, WA (US); Mark David Lawrence, Duvall, WA (US); Matthias Leibmann, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 791 days.

(21) Appl. No.: 11/021,750

(22) Filed: Dec. 23, 2004

(65) Prior Publication Data

US 2006/0143447 A1 Jun. 29, 2006

(51) Int. Cl.
*H04L 9/00* (2006.01)
(52) U.S. Cl. .................. 713/166; 713/164; 713/165; 726/21; 726/26; 726/27; 726/28
(58) Field of Classification Search .................. 713/166
See application file for complete search history.

(56) References Cited

U.S. PATENT DOCUMENTS

| | | | |
|---|---|---|---|
| 5,717,924 A | | 2/1998 | Kawai |
| 5,881,225 A | * | 3/1999 | Worth .................. 726/17 |
| 5,911,143 A | * | 6/1999 | Deinhart et al. ........ 707/103 R |
| 6,006,328 A | | 12/1999 | Drake |
| 6,073,242 A | | 6/2000 | Hardy et al. |
| 6,192,405 B1 | | 2/2001 | Bunnell |
| 6,334,121 B1 | | 12/2001 | Primeaux et al. |
| 6,389,589 B1 | | 5/2002 | Mishra et al. |
| 6,490,680 B1 | * | 12/2002 | Scheidt et al. .............. 713/166 |
| 6,751,657 B1 | | 6/2004 | Zothner |
| 7,062,537 B2 | | 6/2006 | Aziz et al. |
| 7,185,192 B1 | * | 2/2007 | Kahn ..................... 713/155 |
| 7,194,631 B2 | * | 3/2007 | Numano .................. 713/183 |
| 7,237,191 B1 | | 6/2007 | Sulistio et al. |
| 7,240,015 B1 | | 7/2007 | Karmouch et al. |
| 7,409,447 B1 | | 8/2008 | Assadzadeh |
| 2001/0034733 A1 | | 10/2001 | Prompt et al. |
| 2002/0147801 A1 | | 10/2002 | Gullotta et al. |
| 2002/0184485 A1 | | 12/2002 | Dray, Jr. et al. |
| 2003/0115179 A1 | | 6/2003 | Prabakaran et al. |
| 2003/0115322 A1 | | 6/2003 | Moriconi et al. |
| 2004/0054565 A1 | | 3/2004 | Nemecek et al. |
| 2004/0103073 A1 | | 5/2004 | Blake et al. |
| 2004/0111643 A1 | | 6/2004 | Farmer |
| 2004/0148299 A1 | | 7/2004 | Teegan et al. |
| 2004/0204949 A1 | * | 10/2004 | Shaji et al. ................ 705/1 |

(Continued)

OTHER PUBLICATIONS

Fred Schneider, "Enforcable Security Policies", ACM Trasactions on Information and System Security, vol. 3, No. 1, Feb. 2000, pp. 30-50.*

(Continued)

*Primary Examiner*—Ponnoreay Pich
(74) *Attorney, Agent, or Firm*—Lee & Hayes, PLLC

(57) ABSTRACT

A method includes associating a task with one or more elevated rights, wherein the task is associated with a user's job responsibility and granting an elevated right account to the user based on a principle of least privilege, wherein the elevated right account provides the one or more elevated rights necessary to perform only the task associated with the elevated rights.

12 Claims, 3 Drawing Sheets

U.S. PATENT DOCUMENTS

| | | |
|---|---|---|
| 2004/0210662 A1 | 10/2004 | Lim et al. |
| 2005/0060342 A1 | 3/2005 | Farag |
| 2005/0071359 A1 | 3/2005 | Elandassery et al. |
| 2005/0086126 A1* | 4/2005 | Patterson .................... 705/26 |
| 2005/0091269 A1 | 4/2005 | Gerber et al. |
| 2005/0139649 A1 | 6/2005 | Metcalf et al. |
| 2005/0144019 A1 | 6/2005 | Murakami et al. |
| 2005/0149450 A1 | 7/2005 | Stefik et al. |
| 2005/0149552 A1 | 7/2005 | Chan et al. |
| 2005/0187957 A1 | 8/2005 | Kramer et al. |
| 2005/0289072 A1 | 12/2005 | Sabharwal |
| 2006/0031757 A9 | 2/2006 | Vincent, III |
| 2006/0048218 A1 | 3/2006 | Lingafelt et al. |
| 2006/0048236 A1 | 3/2006 | Multerer et al. |
| 2006/0059128 A1 | 3/2006 | Ruggle et al. |
| 2006/0107046 A1 | 5/2006 | Raley et al. |
| 2006/0129589 A1 | 6/2006 | Thornton et al. |
| 2006/0155725 A1 | 7/2006 | Foster et al. |
| 2007/0124797 A1 | 5/2007 | Gupta et al. |

OTHER PUBLICATIONS

Ferraiolo et al, "A Role-Based Access Control Model and Reference implementation Within a Corporate Intranet", ACM Transactions on Information and System Security, vol. 2, No. 1, Feb. 1999, pp. 34-64.*

Ferraiolo et al, "Proposed NIST Standard for Role-Based Access Control", ACM Transactions on Information and System Security, vol. 4, No. 3, Aug. 2001, pp. 224-274.*

Sandhu et al, "The NIST Model for Role-Based Access Control: Towards A Unified Standard", unknown publisher, unknown date, 17 pages.*

"Understanding Active Directory Replication", 2000, pp. 171-179.

Velegrakis, et al., "Preserving Mapping Consistency Under Schema Changes", Springer-Verlag, 2004, pp. 274-293.

Marriott, et al., "Management Policy Service for Distributed Systems", IEEE, 1996, pp. 2-9.

* cited by examiner

US 7,529,931 B2

MANAGING ELEVATED RIGHTS ON A NETWORK

CROSS-REFERENCE TO RELATED APPLICATIONS

The present application is related to U.S. patent application Ser. No. 11/021,745 entitled "SYSTEMS AND PROCESSES FOR MANAGING POLICY CHANGE IN A DISTRIBUTED ENTERPRISE", U.S. patent application Ser. No. 11/021,745 entitled "SCHEMA CHANGE GOVERNANCE FOR IDENTITY STORE", and U.S. patent application Ser. No. 11/021,865 entitled "SYSTEMS AND PROCESS FOR SELF-HEALING AN IDENTITY STORE", which are assigned to the Assignee of the present application, and incorporated herein by reference for all that they disclose.

BACKGROUND

Corporations and other organizations typically include a network and identity repository for keeping track of organizational resources. For example, a metadirectory can be used to store metadata that represents computers, employees, user accounts, application programs and other real-world entities, so that such organizational entities can be identified, tracked and managed. In large organizations identity information may be distributed across many systems in many domains. It is important that access to the identity repository and network resources be managed to ensure network security.

Typically users on the network are granted some basic level of network access. For example, all users can access their own email account. Most users can also typically access certain resource directories on the network to perform their day-to-day tasks. Other users need to be able to access more network resources or the identity store itself and these users are called administrators (admins). For example, some admins must be able to manage accounts or edit schema.

Users with greater access rights have correspondingly elevated rights. Diligent management of all accounts granting elevated rights in a domain is of utmost importance. History has shown that accounts with elevated rights can be used in such a way that compromises network resource security, intentionally or accidentally. For example, an account with elevated rights can be used to gain access to confidential or private data.

Many other, more harmful problems can be caused by a user with access to an account with elevated rights. For example, compromised accounts used to run a service with elevated access can be stealthily used as a jumping off point to all other systems and servers. As such, the likelihood that accounts with elevated rights will be targeted for compromise again in the future is believed to be high. In addition, organization policies and government regulations (e.g., Sarbanes-Oxley Act) can impose standards of security that must be followed in organizations.

In traditional approaches, a user who is granted elevated rights typically is granted the elevated rights based on the group or team that the user is a part of, regardless of whether the user actually needs elevated rights to perform his/her day-to-day job. In addition, accounts with elevated rights have traditionally included the basic user rights. Thus, users with elevated rights accounts traditionally have had no need for a basic user account, and simply use their elevated rights accounts to perform all of their day-to-day tasks. However, accounts with elevated rights are usually intended only for use in performing tasks associated with those elevated rights. As such, traditional approaches result in many accounts with unnecessary elevated rights, resulting in higher risk of improper and inadvertent uses of accounts with elevated rights.

Accordingly, there is a strong need for processes and systems in support of security, privacy and regulatory compliance to manage accounts with elevated rights.

SUMMARY

An implementation of a process described herein includes associating a task with one or more elevated rights, wherein the task is associated with a user's job responsibility. An elevated right account is granted to the user based on a principle of least right, wherein the elevated rights account provides the lowest possible elevated rights necessary to perform only the task associated with the elevated rights.

DETAILED DESCRIPTION

Figure 1:
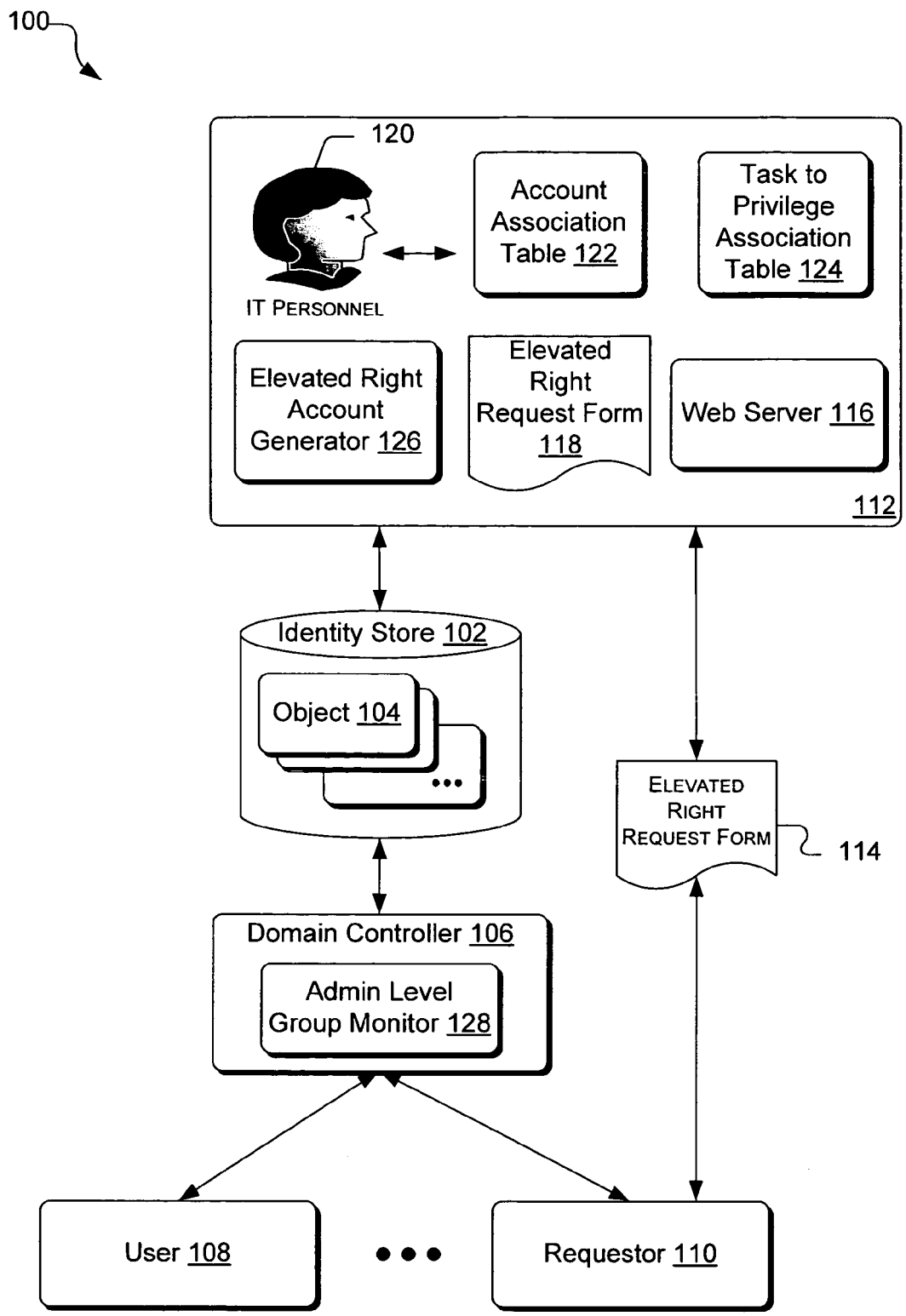
FIG. 1 illustrates an exemplary system for generating the elevated rights account for a user based on the user's assigned tasks.

FIG. 1 illustrates an exemplary system 100 for granting an elevated right account to a user based on the user's assigned tasks. The elevated right account is granted based on a principle of least privilege, wherein the elevated rights provided by the account are sufficient to enable the user to perform only the task(s) assigned to the individual and associated with the granted elevated rights. The elevated right account is separate from, but associated with the user's basic user account, which does not provide elevated rights.

The implementation shown in FIG. 1 includes an identity store 102 having objects 104 that represent real-world entities relevant to a corporation, or other organization. Real-world entities include, but are not limited to, user accounts, resources, roles, files, application programs, computers, and network appliances. The identity store 102 enables an organization to identify the real-world entities and maintain attribute information descriptive of the real-world entities. Preferably, the identity store 102 also allows for higher-level functions, such as, secure access to, and tracking use of, the real-world entities.

Particularly relevant to this application are user account objects 104 that exist in the identity store 102. User account objects 104 specify attributes such as the user name and password, as well as a level of right provided by the user account. Some user account objects 104 provide only a basic right level, such as the ability to access the associated user's email account. Other user account objects 104 provide a greater level of right such as the ability to access a domain controller 106. The particular implementation includes a domain controller 106 that corresponds to a domain within the organization.

Within each domain are one or more users 108. Users 108 are typically granted user accounts to perform tasks associated with their job responsibilities. The user accounts are embodied in associated user account objects 104 in the identity store 102. The user accounts provide rights associated with the user's 108 assigned tasks. One particular implementation of the identity store 102 and domain controller 106 is ACTIVE DIRECTORY by MICROSOFT.

When a user 110 wants or needs to have more rights, the user 110 requests an elevated right account from an information technology (IT) group 112. This is shown with the requestor (i.e., requesting user) 110 sending a completed elevated right request form 114 to the IT group 112. The elevated right request form 114 can be a hard copy (i.e., paper) form or an electronic form, such as a web form. As shown in the particular implementation, the IT group includes a web server 116 that generates a downloadable and editable HTML-based web form called the elevated right request form 118. The requestor 110 can access the elevated right request form 118 via the internet, fill out the form on a computer, and submit the completed form 114 electronically.

The elevated right request form 118 is a template including fields in which the requestor 110 can specify various data pertaining to the elevated right requested. By way of example, but not limitation, the elevated right request form can specify the type of elevated right being requested, justification for the elevated right, reasons for expedited treatment of the request, the user's name, the user's director's name, the user's job title and responsibilities. Types of elevated rights that can be specified include, but are not limited to, domain level administrative access, domain controller 106 access, IT member server access, and application owner access.

The IT group 112 includes IT personnel 120, an account association table 122, a task association table 124, and an elevated right account generator 126 in addition to the web server 116 and the web form 118. The IT personnel 120 include one or more individuals or bodies who play different roles in analyzing a request for elevated rights and/or granting elevated rights. The IT individuals or bodies typically have varying degrees of authority in granting elevated rights. For example, in one particular implementation, the IT personnel 120 include a governance body, a director, a support group, and project management.

When IT personnel receive the completed elevated access request form 114 from the user, the IT personnel 120 analyze the request based on tasks assigned to the user by virtue of the user's job responsibility. For example, if the requestor 110 is a system administrator whose tasks include accessing the identity store, the requestor 110 will require elevated rights that will provide him/her the ability to access the identity store 102. If the requestor 110 is a clerk whose tasks include only data or text entry, then the requestor 110 probably will not require an elevated right. The association between tasks and elevated rights is provided by the task association table 124. The task association table 124 is a data structure that is stored in memory.

An exemplary implementation of the task association table 124 is shown below in Table 1:

TABLE 1

Exemplary format for Task Association Table

| Task ID | Right ID |
|---|---|
| Task 1 | None |
| Task 2 | None |
| Task 3 | Right Set A |
| Task 4 | Right Set B |
| etc. | etc. |

Table 1 above includes two columns: Task ID and Right ID. The Task ID column includes identifiers for tasks associated with job responsibilities. The Right ID column includes identifiers for sets of rights that are necessary to perform the associated task. Table 1 is only one illustrative example of an implementation of the task association table 124. Those skilled in the art will readily recognize many other useful implementations of the task association table 124.

The IT personnel 120 use the task association table 124 to determine whether to grant elevated rights and to determine which right set to grant. In one implementation, the elevated rights are granted according to a principle of least right. The principle of least privilege dictates that a user will be granted the least elevated right in order to perform his/her assigned tasks. As such, the user will not be granted more or fewer rights that the user needs to perform his/her tasks. This will assure the user that the elevated right account that is granted is necessary and sufficient to perform his/her day-to-day job responsibilities.

In an exemplary implementation, the IT personnel 120 grant elevated rights based on job responsibility criteria. Job responsibility criteria includes the tasks associated with the job responsibility, but also includes other relevant information related to the job responsibility. By way of example, but not limitation, the job responsibility criteria can include the frequency of the tasks (e.g., daily, weekly, monthly) and a specified time limit associated with the tasks (e.g., not longer than one month). Accordingly, the IT personnel can grant an elevated right account in a manner that is customized to the job responsibility criteria. For example, the elevated right account may have a lifecycle of only one month if the associated job responsibility lasts only one month.

The IT personnel 120 employ the elevated right account generator 126 to create the elevated right account. Granting the elevated right account involves creating an elevated right account object in the identity store. The elevated right account has its own unique identifier. The unique identifier is separate and distinct from the identifiers of any other user account objects. This is true even though the user who is granted the elevated right account may also have another basic (i.e., non-elevated) user account.

When an elevated right account is granted, an entry is created in the account association table. The account association table associates elevated right accounts with other user account(s) that are granted to the same user. For example, when the requestor 110 is granted an elevated right, the entry that is created in the account association table includes the requestor's 110 elevated right account ID and the requestor's 110 basic user account ID.

TABLE 2

Exemplary format for Accounts Association Table

| Basic Account ID | Right Account ID |
|---|---|
| Basic ID 1 | Right Account ID A |
| Basic ID 2 | Right Account ID B |
| Basic ID 3 | Right Account ID C |
| etc. | etc. |

Table 2 illustrates only one exemplary format for the accounts association table 122. Those skilled in the art will readily recognize numerous other useful implementations of the accounts association table 122. For example, the table may associate more than two user accounts: a basic user account, a domain-level elevated right account, and an IT member server elevated right account.

As a result, a user 108 may have two or more accounts, with each user account providing different, non-overlapping rights. The term non-overlapping refers to the fact that each user account provides a set of rights associated with a particular task. For example, the user 108 can typically use his/her basic user account to access his/her email account, but the user 108 will not be able to access his email account with the elevated right account. Conversely, the user 108 will be able to perform a task such as accessing the domain controller 106 using the elevated right account, but the user 108 will not be able to access the domain controller 106 through the basic user account.

Because an elevated right account provides greater rights to the associated user 108, activities performed through the elevated right account could pose a greater security risk than a basic user account. For example, the user 108 may be able to change other user account objects through the elevated right account. The elevated right account could be used for malicious purposes if obtained by an unauthorized user. As such, in one implementation, use of the elevated right account requires 2-factor authentication, which requires the user to know specified information (e.g., a password) and to have a specified item (e.g., a physical media card). As an example, 2-factor authentication may require the user to have a PIN number and a Smartcard.

An elevated right account can provide elevated access to member servers (those servers maintained by the IT group) or to the domain controller 106. It can be useful to treat domain-level access and member server access in a manner that affords greater security to such accounts. For example, in a particular implementation of the elevated right account generator 126, accounts with elevated domain access or IT member server access are designed according to the following rules:

- be created and managed by a small, core group of IT personnel
- will not be enabled for remote access or email
- will be set to require 2-factor authentication
- must use a password of 15 or more characters
- will not be used to run services
- are granted access commensurate with routine job responsibilities, and that justification for the account and its access be verified periodically
- will be used only for the purposes for which they were authorized In a particular implementation, all "permanent" elevated access, whether on the domain or on IT member servers, is reviewed for business viability every six months. Access is updated as necessary to ensure access is commensurate with current job responsibilities and is therefore in compliance with Sarbanes-Oxley (SOX) guidelines.

According to an exemplary implementation, temporary elevated access can be granted when a user is called upon to perform a task on a temporary basis that requires access over and above that held for his/her routine job responsibilities. In this implementation, such temporary tasks are considered to be scheduled work and therefore an associated request must be submitted a specified time period in advance of the task completion date, allowing the request to be handled according to a normal review and approval processes. In the event of an emergency requiring expedited granting of elevated access, an emergency process may be invoked as is described below with reference to FIG. 2.

A particular implementation of the domain controller 106 includes a Windows 2000 domain. The Windows 2000 domain includes a container called AdminSDHolder, which controls ACLS (Access Control Lists) on accounts with elevated rights. AdminSDHolder is used to set a consistent, strengthened security descriptor on these administrative level accounts. To further enhance the security of these critical accounts, the ability to modify administrative level accounts is restricted to a small subset of users in the built-in administrators group. Restrictions include limiting who can reset the password on an elevated account and who can modify the membership of these key groups. Group restriction is accomplished by setting ACLS in the AdminSDHolder container limiting the users on the ACLS who can use the AdminSDHolder container.

Within the domain controller 106, an admin level group monitor 128 performs administrative access management by alerting to changes to the administrative level groups, and timely correcting any unauthorized modifications. The admin level group monitor 128 checks a predefined list of key groups, ensuring that there has been no change to the membership of each group. Types of changes that are checked for include, but are not limited to, addition or removal of group members. In one implementation, the check is made by the admin level group monitor 128 on a nearly real time basis. In another implementation, the check is made periodically.

Changes to group memberships could be made by authorized users or unauthorized users. A list of authorized users is accessed by the admin level monitor 128 to determine if a change was made by an authorized or unauthorized user. When a change is found that was made by an authorized user, an alert is sent to one or more users in the IT personnel 120 notifying them of the modification. Notification to the IT personnel 120 provides a means of tracking access modifications and verifying that the alerting system itself has not been compromised and a malicious user was not added to the list of users authorized to make admin access modifications. When the change was made by an authorized user, the alert can be sent by a basic mechanism, such as email, which has relatively low urgency.

In an exemplary implementation of the admin level group monitor 128, a higher priority is given to changes that were made by an unauthorized user. In this implementation, the admin level group monitor 128 uses the list of authorized users to identify any group changes that were made by a user who is not in the set of authorized users. Such changes by unauthorized users are typically considered to be a greater security problem than changes that were made by authorized users. As such, the admin level group monitor 128 searches for changes by unauthorized users and sends an alert when such a change is found via a higher urgency notification mechanism, such as a pager, as well as via email. In addition, metadata information is pulled from the account, including where and when the change was made, and the account is immediately reverted to the state prior to the change. By pulling the metadata from the group prior to healing its membership, the IT personnel 120 are provided with all the information necessary for investigation of the root cause of the compromise.

Modules (e.g. elevated right account generator 126, admin level group monitor 128) shown in FIG. 1 may be implemented with any of various types of computing devices known in the art, depending on the particular implementation, such as, but not limited to, a desktop computer, a laptop computer, a personal digital assistant (PDA), a handheld computer, or a cellular telephone. The computing devices typically communicate via a communications network, which may be wired or wireless.

Figure 3:
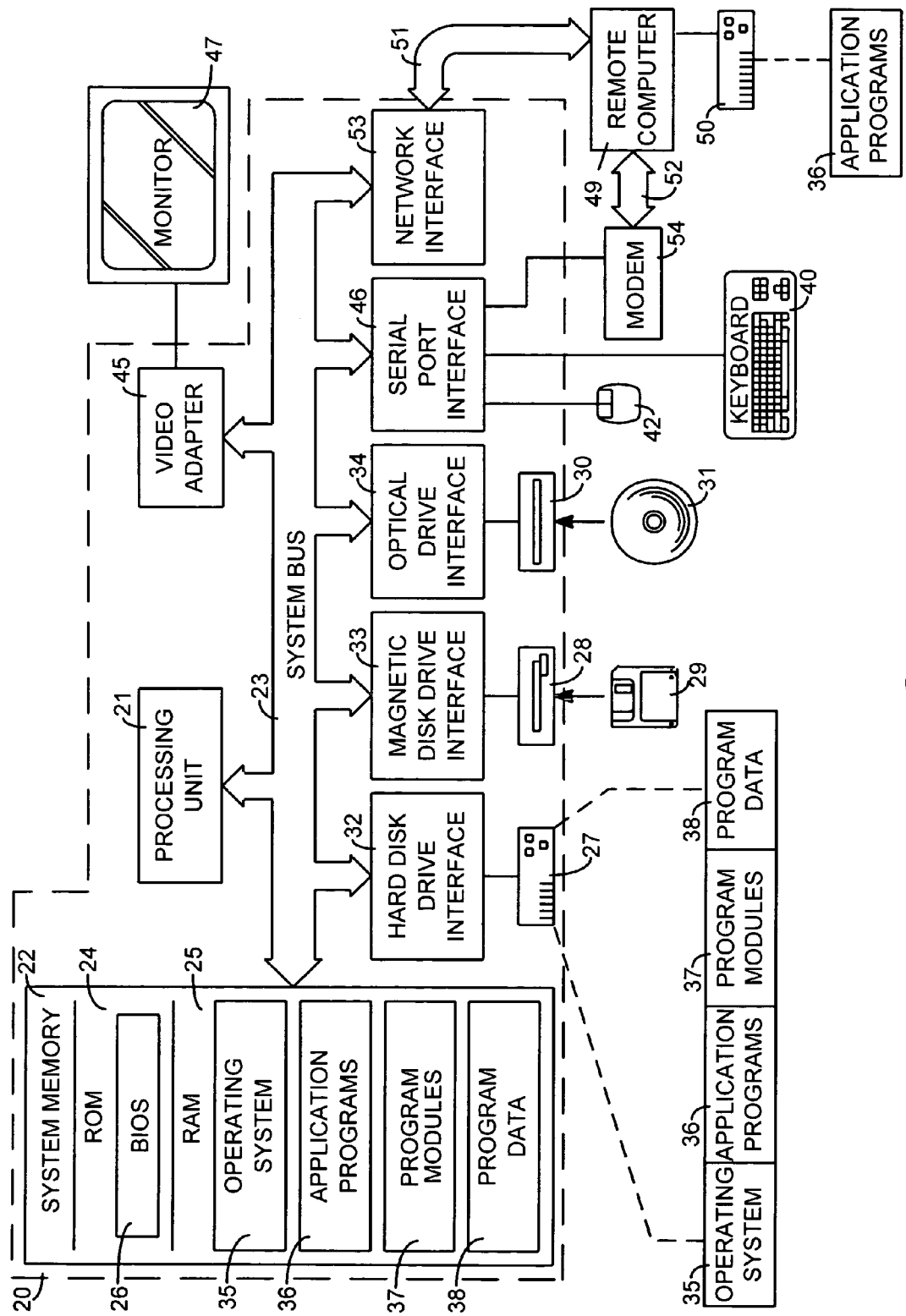
FIG. 3 illustrates a general purpose computer that can be used to implement various processes and systems described herein.

In addition, the computing devices may be arranged in any convenient configuration, such as, but not limited to client/server and peer-to-peer configurations. Modules shown in FIG. 1 can be implemented in software or hardware or any combination of software or hardware. FIG. 3, discussed in detail below, illustrates an exemplary computing environment that may be used to implement the computing devices, applications, program modules, networks, processes and data discussed with respect to FIG. 1.

Exemplary Operations

Figure 2:
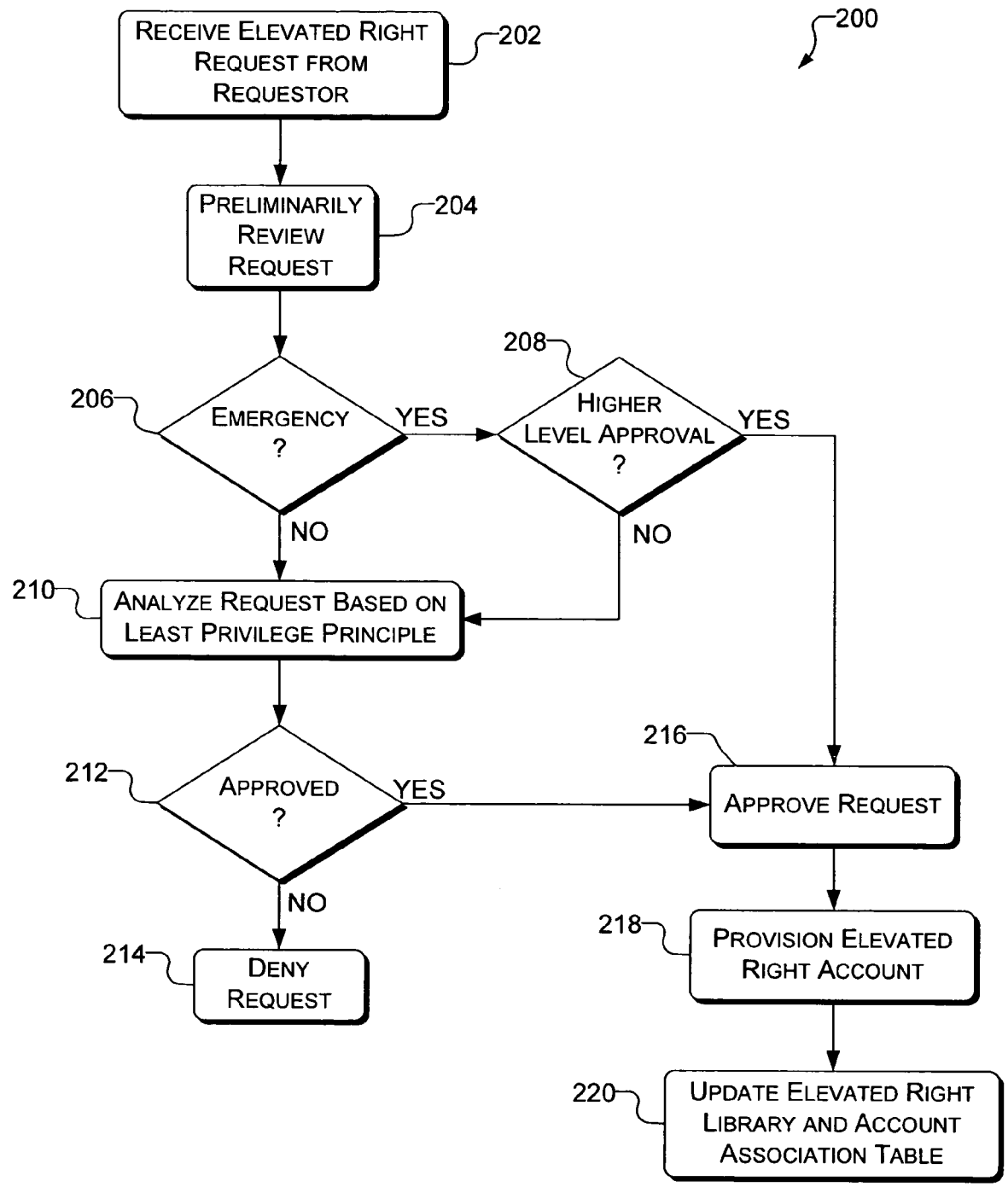
FIG. 2 illustrate exemplary algorithms for determining whether a user should be issued an elevated rights account based on the user's assigned tasks, generating the elevated rights account, and associating the user's non-elevated rights account with the elevated rights account.

FIG. 2 illustrates an exemplary process 200 for granting an elevated rights account based on a principle of least privilege. The process may be carried out by the system shown in FIG. 1 or other applicable systems.

A receiving operation 202 receives a completed elevated right request form from a requesting user. The receiving operation 202 may receive the elevated right request form by way of an email message, a web form, a paper copy, or otherwise. As discussed above, the completed elevated right request form specifies data related to the elevated right being request, such as the business justifications for the elevated right. A preliminary reviewing process 204 reviews the elevated right request form for completeness and formal requirements.

A determining operation 206 determines whether the request is an emergency. If the requestor specifies emergency treatment, the process 200 branches "YES" to another determining operation 208. The determining operation 208 approves or disapproves the request for emergency treatment based on reasons given by the requestor for emergency treatment. Emergency treatment is an expedited process of granting the requested elevated right account.

The determining operation 208 typically involves one or more higher level personnel deciding whether to allow emergency treatment. The higher level personnel can include, by way of example, one or more of an IT governance body, the user's director (i.e., supervisor), and the IT director. The determining operation 208 applies emergency criteria to make the determination. Emergency criteria specify valid reasons for allowing emergency treatment. Exemplary emergency criteria are: a complete work stoppage without the elevated right account, more than a specified number of users are adversely affected without the elevated right, a business stoppage issue, a security issue.

If the determining operation 208 does not approve the request for emergency treatment or if the determining operation 206 determines that no emergency exists, the process 200 branches "NO" to an analyzing operation 210. The analyzing operation 210 analyzes the elevated right request based on the principle of least right. Accordingly, the analyzing operation 210 considers the job responsibility of the requestor, including tasks associated with the job responsibility, and identifies the least right or set of rights required to perform the tasks. The analyzing operation 210 can also consider other job responsibility criteria, such as the frequency of the task performance and any time limit on the task. As discussed above in FIG. 1, the least right can be determined using a task association table.

The least right identified in the analyzing operation 210 may or may not correspond to the right that the requestor has requested. In this case, the requestor will be denied as to the requested right, but will typically be approved for the least right identified in the analyzing operation 210.

A determining operation 212 approves or denies the elevated right request based on the analysis of the request in operation 210. To decrease the likelihood of improper approval, in one implementation the determining operation 212 requires the approval of various IT personnel or other personnel, such as the requestor's supervisor. If the request is not approved in the determining operation 212, the process branches "NO" to a denying operation. The denying operation 212 notifies the requestor that the request for en elevated right account is denied.

However when the determining operation 212 approves the request or when the determining operation 208 approves emergency treatment of the request, the process 200 branches "YES" to an approving operation 216. The approving operation 206 notifies the requestor that the request for an elevated right account has been approved.

A provisioning operation 218 creates the approved elevated right account. The provisioning operation 218 creates a unique ID for the elevated right account and an associated elevated right account object in the identity store. The elevated right account object include relevant descriptive attributes, such as, but not limited to, the ID, user name, access rights, password, type of secondary authentication (e.g., SmartCard) etc.

An updating operation 220 updates an elevated right library and account association table. The elevated right library identifies all elevated right accounts so that they can be easily tracked, managed, and reevaluated periodically. The updating operation 220 adds an entry in the account association table that associates the requestor's basic user account with the newly created elevated right account.

Exemplary Computing Device

With reference to FIG. 3, an exemplary system for implementing various processes, data structures, and systems described herein includes a general-purpose computing device in the form of a conventional personal computer 20, including a processing unit 21, a system memory 22, and a system bus 23. System bus 23 links together various system components including system memory 22 and processing unit 21. System bus 23 may be any of several types of bus structures including a memory bus or memory controller, a peripheral bus, and a local bus using any of a variety of bus architectures. System memory 22 includes read only memory (ROM) 24 and random access memory (RAM) 25. A basic input/output system 26 (BIOS), containing the basic routine that helps to transfer information between elements within the personal computer 20, such as during start-up, is stored in ROM 24.

As depicted, in this example personal computer 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD ROM, DVD, or other like optical media. Hard disk drive 27, magnetic disk drive 28, and optical disk drive 30 are connected to the system bus 23 by a hard disk drive interface 32, a magnetic disk drive interface 33, and an optical drive interface 34, respectively. These exemplary drives and their associated computer-readable media provide nonvolatile storage of computer readable instructions, data structures, computer programs and other data for the personal computer 20.

Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, random access memories (RAMs), read only memories (ROMs), and the like, may also be used in the exemplary operating environment.

A number of computer programs may be stored on the hard disk, magnetic disk 29, optical disk 31, ROM 24 or RAM 25, including an operating system 35, one or more application programs 36, other programs 37, and program data 38. A user may enter commands and information into the personal computer 20 through input devices such as a keyboard 40 and pointing device 42 (such as a mouse).

Other input devices (not shown) may include a camera, microphone, joystick, game pad, satellite dish, scanner, or the like. These and other input devices are often connected to the processing unit 21 through a serial port interface 46 that is coupled to the system bus, but may be connected by other interfaces, such as a parallel port, game port, a universal serial bus (USB), etc.

A monitor 47 or other type of display device is also connected to the system bus 23 via an interface, such as a video adapter 45. In addition to the monitor, personal computers typically include other peripheral output devices (not shown), such as speakers and printers.

Personal computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to the personal computer 20.

The logical connections depicted in FIG. 3 include a local area network (LAN) 51 and a wide area network (WAN) 52. Such networking environments are commonplace in offices, enterprise-wide computer networks, Intranets and the Internet.

When used in a LAN networking environment, personal computer 20 is connected to local network 51 through a network interface or adapter 53. When used in a WAN networking environment, the personal computer 20 typically includes a modem 54 or other means for establishing communications over the wide area network 52, such as the Internet. Modem 54, which may be internal or external, is connected to system bus 23 via the serial port interface 46.

In a networked environment, computer programs depicted relative to personal computer 20, or portions thereof, may be stored in a remote memory storage device. It will be appreciated that the network connections shown are exemplary and other means of establishing a communications link between the computers may be used.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer-readable media. Computer-readable media can be any available media that can be accessed by a computer. By way of example, and not limitation, computer-readable media may comprise "computer storage media" and "communications media."

"Computer storage media" includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer-readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer-readable media.

Although the exemplary operating embodiment is described in terms of operational flows in a conventional computer, one skilled in the art will realize that the present invention can be embodied in any platform or environment that processes and/or communicates video signals. Examples include both programmable and non-programmable devices such as hardware having a dedicated purpose such as video conferencing, firmware, semiconductor devices, hand-held computers, palm-sized computers, cellular telephones, and the like.

Although some exemplary methods and systems have been illustrated in the accompanying drawings and described in the foregoing Detailed Description, it will be understood that the methods and systems shown and described are not limited to the particular implementation described herein, but rather are capable of numerous rearrangements, modifications and substitutions without departing from the spirit set forth herein.

What is claimed is:

1. A method comprising:
   associating a task with one or more elevated rights using a task association table stored in a computer's memory, wherein the task is associated with a user's job responsibility; and
   granting an elevated right account to the user, the granting comprising:
      basing the elevated right account on a principle of least right; and
      constraining the elevated right account to provide the one or more elevated rights necessary to perform only the task associated with the elevated rights, wherein the rights associated with the elevated right account are non-overlapping with basic rights provided in a basic user account, wherein the basic user account comprises a non-elevated user account.

2. A method as recited in claim 1 wherein the elevated right account is separated from the basic user account that provides only basic right to the user.

3. A method as recited in claim 2 further comprising associating the basic user account with the elevated right account.

4. A method as in claim 2, further comprising assigning an account identifier to the elevated right account, wherein the account identifier is different from an account identifier assigned to the basic user account.

5. A method as recited in claim 1 further comprising periodically reevaluating whether the user should be granted the elevated right account based on the user's job responsibility.

6. A method as recited in claim 1 wherein the granting further comprises granting elevated right based on job responsibility criteria, the job responsibility criteria comprising one or more of the following:
- tasks associated with the job responsibility;
- frequency of performance of the tasks;
- a specific time limit associated with the tasks; and
- a specified time limit associated with the job responsibility.

7. A method as recited in claim 1 wherein the elevated right account requires two-factor authentication for access to the elevated right account.

8. A method as recited in claim 7 wherein the two-factor authentication comprises a password and a physical media.

9. A method as recited in claim 1 further comprising receiving a request for the elevated right account, wherein the request comprises a completed web form.

10. A method as recited in claim 1 further comprising provisioning the elevated right account by creating an elevated right account object in an identity store.

11. A computer-readable storage medium having computer-executable instructions for performing the method of claim 1.

12. A system comprising:
- a memory;
- a task association table stored on the memory and associating a task with a set of one or more rights required to perform the task; and
- means for generating an elevated right account enabling an associated user to perform only the task by virtue of the one or more rights, wherein the rights associated with the elevated right account are non-overlapping with basic rights provided in a basic user account, wherein the basic user account comprises a non-elevated user account.

* * * * *

UNITED STATES PATENT AND TRADEMARK OFFICE
CERTIFICATE OF CORRECTION

PATENT NO. : 7,529,931 B2  Page 1 of 1
APPLICATION NO. : 11/021750
DATED : May 5, 2009
INVENTOR(S) : Karan Vasishth et al.

It is certified that error appears in the above-identified patent and that said Letters Patent is hereby corrected as shown below:

On the Title Page, change Inventor's Name (spelling)

Column 1, Item 75, change "Karen Vasishth"

to --Karan Vasishth--

Signed and Sealed this

Nineteenth Day of January, 2010

David J. Kappos
*Director of the United States Patent and Trademark Office*